Patented Nov. 27, 1951

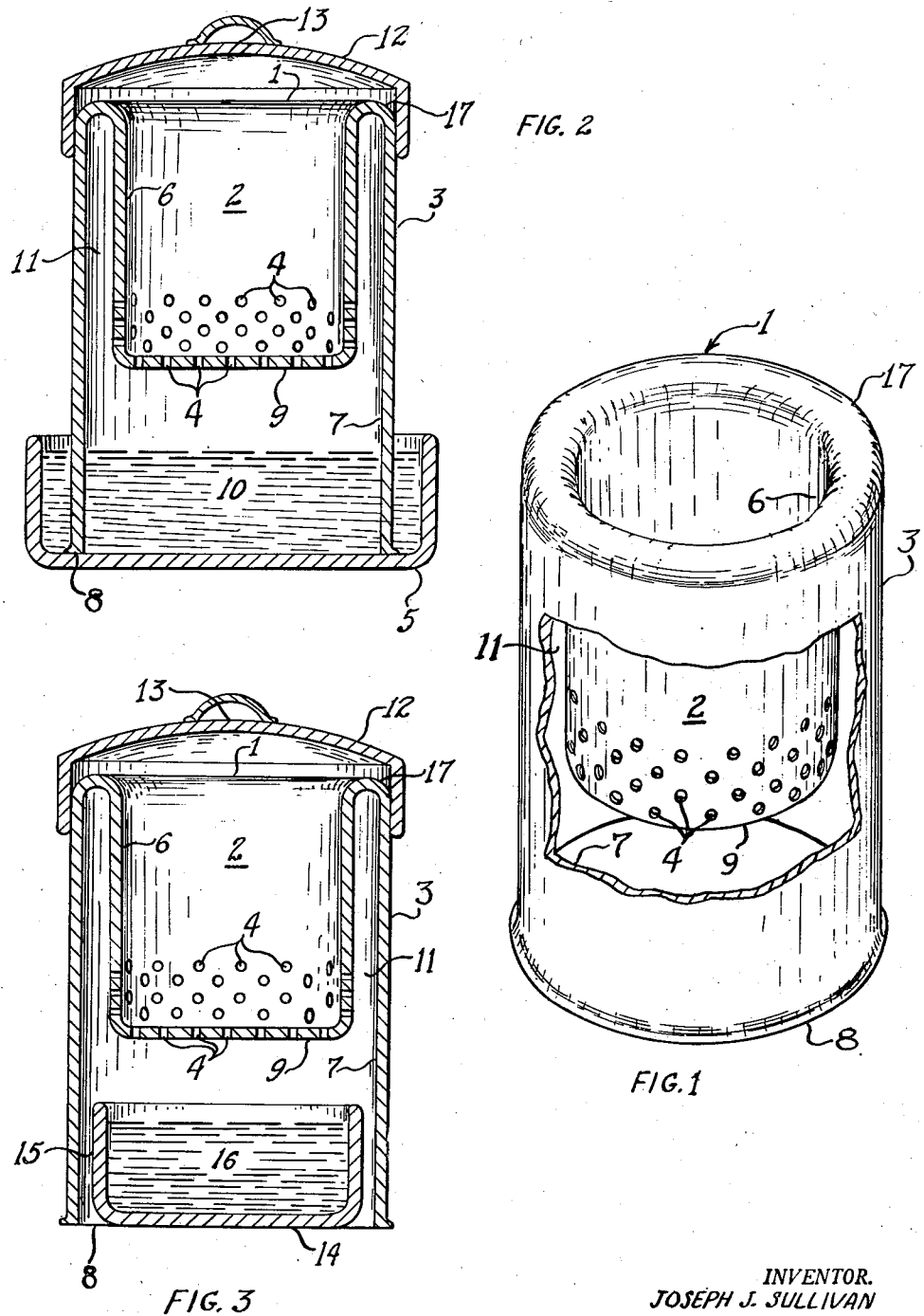

2,576,313

UNITED STATES PATENT OFFICE 2,576,313

FOOD STEAM COOKER

Joseph J. Sullivan, Jamaica, N. Y.

Application March 1, 1948, Serial No. 12,380

1 Claim. (Cl. 126—376)

This invention relates generally to kitchen utensils and particularly to a food steam cooker.

An object of the invention is to provide a new and novel type of cooking utensil for the kitchen.

Another object of this invention is to provide a cooking utensil that has advantages of the pressure cooker, but does not have the dangers and faults of the pressure cooker; such faults as, need of critical attention, blowing up, constant replacement of gaskets, expensiveness, overcooking, and others.

A further object of my invention is to provide a simple, efficient, uncomplicated and inexpensive food steam cooker.

My cooker not only is able to utilize steam in the cooking process, but it is so designed as to be able to combine the dry heat of the fuel gases with steam, which combination gives to foods a uniform degree of cooking and a crispness not obtained by either a pressure cooker or the ordinary cooking pot.

Further objects and advantages of the invention become obvious as this specification proceeds in detail and by reading it with reference to the accompanying drawings wherein a preferred form of the invention is illustrated.

Fig. 1 is a perspective view of the perforated cylindrical cooking vessel and its jacket with a portion of the jacket broken away.

Fig. 2 is a vertical diametrical sectional view of the invention.

Fig. 3 is a vertical diametrical sectional view of the invention with a water container the width of which is smaller than the diameter of the jacket of the cooking vessel.

This invention consists of a perforated cylindrical cooking vessel or receptacle contained within the encircling wall of an open bottomed cylindrical jacket, a water container serving as a source of steam to the cooking vessel, and a cover for the cooking vessel.

Describing this invention in greater detail, numeral 1 designates a cooking unit which consists of an inner cylindrical cooking vessel or receptacle 2 wherein the food to be cooked is placed, and an encircling jacket 3. Vessel 2 has perforations 4 serving to permit steam generated from the water container 5 to enter into the cooking vessel 2. The wall 6 of cooking vessel 2 projects upwardly, flanges outward at the brim 17, and then descends downwardly to form the cylindrical jacket 3. It is preferred that the cooking unit 1 with its inner perforated vessel 2 and its outer flanged and encircling jacket be fashioned as one integral part. The cooking vessel 2 is contained wholly within the wall 7 of the cylindrical jacket 3. The base end 8 of the jacket is open and extends beyond the bottom 9 of the cooking vessel 2. By extending the base end 8 beyond the bottom 9 of the inner cooking vessel, the inner cooking vessel will be positioned above and out of the water 10 contained in water pan 5. Between the wall 7 of the encircling jacket 3 and the wall 6 of the inner cooking vessel 2 is a space 11. This space is preferred as it enables steam and heat to completely surround the wall of the cooking vessel. The cover 12 provided for the cooking unit 1 is preferably crowned at the center 13, and is preferably a cover of the cap type.

Water heated over a range in a suitable pan supplies steam to the cooking unit 1. The width of the water pan may be either wider or shorter than the diameter of the base end 8 of the encircling jacket 3. When the wider pan is used as shown in Fig. 2 the base end 8 of the jacket stands in the water 10 causing whatever food may be placed in cooking vessel 2 to be wholly steam cooked. When the narrower water pan is used designated 14 in Fig. 3 the base end 8 of the jacket 3 surrounds the wall 15 of the water pan, which permits dry heat from the gases of the cooking range to pass up into space 11 and to combine with steam generated from water 16 in the pan. This combination of dry heat and steam causes foods to cook rapidly and uniformly, and adds a crispness to the cooked foods not obtained by a pressure cooker or the ordinary pot cooker.

It is to be understood that while I have herein shown a preferred embodiment of my invention, I claim all forms of the invention to which I am entitled in view of the scope of the appended claim.

I claim as new:

In a combined hot air and steam food cooker of the character described the combination for use with a source of heat of, an inner cylindrical food receptacle, a jacket encircling the inner receptacle, said jacket being spaced a uniform distance from the inner receptacle and the brim of the inner receptacle being flanged outward and being integral with the brim of the encircling jacket, said inner receptacle having a bottom wall, a series of perforations in said bottom wall and also a series of perforations in its cylindrical wall for a short distance up from its bottom, the perforations serving as a means of admission of steam and hot air to the inner receptacle, the wall of the encircling jacket extending downward a substantial distance beyond the bottom wall of the inner receptacle, and said encircling jacket being without a bottom wall, an independent water vessel serving as a source of steam to the inner receptacle and adapted to rest upon the source of heat and to be contained within the encircling wall of the jacket, said jacket and water vessel being separated by a narrow space through which hot air may rise to contact the inner receptacle from the source of heat, and a removable crown cover capping the encircling jacket.

JOSEPH J. SULLIVAN.

REFERENCES CITED

The following references are of record in the file of this patent:

UNITED STATES PATENTS

| Number | Name | Date |
| --- | --- | --- |
| 198,316 | Smith | Dec. 18, 1877 |
| 263,049 | Krehbiel | Aug. 22, 1882 |
| 269,313 | Ogborn | Dec. 19, 1882 |
| 421,213 | Walsh | Feb. 11, 1890 |
| 475,435 | Burnap | May 24, 1892 |
| 510,798 | Kendall | Dec. 12, 1893 |
| 611,705 | Oberman | Oct. 4, 1898 |
| 1,547,762 | Kohlman | July 28, 1925 |
| 2,089,411 | Olsson et al. | Aug. 10, 1937 |

FOREIGN PATENTS

| Number | Country | Date |
| --- | --- | --- |
| 3,806 | Great Britain | Feb. 23, 1884 |
| 21,684 | Switzerland | May 31, 1900 |
| 118,241 | Germany | Mar. 7, 1901 |
| 13,557 | Sweden | Jan. 4, 1902 |
| 344,158 | France | Aug. 27, 1904 |
| 22,459 | Great Britain | Feb. 27, 1908 |
| 30,150 | Sweden | Dec. 29, 1909 |
| 220,495 | Germany | Mar. 30, 1910 |
| 71,337 | Sweden | Mar. 10, 1931 |